US008353753B2

(12) United States Patent
Thomas

(10) Patent No.: US 8,353,753 B2
(45) Date of Patent: Jan. 15, 2013

(54) WAGERING GAME WITH RANDOMLY FUNDED PROGRESSIVE AMOUNTS

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1632 days.

(21) Appl. No.: 11/632,916

(22) PCT Filed: Jul. 21, 2005

(86) PCT No.: PCT/US2005/025842

§ 371 (c)(1), (2), (4) Date: Jan. 18, 2007

(87) PCT Pub. No.: WO2006/014770

PCT Pub. Date: Feb. 9, 2006

(65) Prior Publication Data

US 2007/0259711 A1 Nov. 8, 2007

Related U.S. Application Data

(60) Provisional application No. 60/591,740, filed on Jul. 28, 2004.

(51) Int. Cl.
*A63F 9/24* (2006.01)
*A63F 13/00* (2006.01)

(52) U.S. Cl. ................ 463/20; 463/16; 463/25; 463/29; 463/42; 273/138.1; 273/138.2; 273/143 R

(58) Field of Classification Search .................... 463/16, 463/20, 25, 29, 42; 273/138.1–2, 143 R
See application file for complete search history.

(56) References Cited

U.S. PATENT DOCUMENTS 4,624,459 A 11/1986 Kaufman .................. 273/143 R
4,837,728 A 6/1989 Barrie et al. .................. 364/412
4,861,041 A 8/1989 Jones et al. .................. 273/292
4,948,134 A 8/1990 Suttle et al. ...................... 273/85
5,116,055 A 5/1992 Tracy ........................ 273/138 A
5,249,800 A 10/1993 Hilgendorf et al. ....... 273/138 A
5,275,400 A 1/1994 Weingardt et al. .............. 463/12
(Continued)

FOREIGN PATENT DOCUMENTS

CA 2 334 546 8/2001
(Continued)

OTHER PUBLICATIONS

Article for "Easy Riches" by Sigma Game, Strictly Slots, 1 page (Aug. 2001).

(Continued)

*Primary Examiner* — Dmitry Suhol
*Assistant Examiner* — Ryan Hsu
(74) *Attorney, Agent, or Firm* — Nixon Peabody LLP

(57) ABSTRACT

A gaming system that includes a gaming terminal with a wagering game. The wagering game includes a plurality of symbols that indicate a randomly selected outcome. The wagering game allows the player to be eligible for a plurality of progressive jackpots. A controller is operative to randomly increase the amount of one or more of the plurality of progressive jackpots by at least a portion of the wager input. Further, the percentages of the portion that are allocated to each progressive jackpot can be randomly selected as well. Thus, the progressive jackpots are randomly funded, instead of being funded by a predetermined percentage of each wager input.

19 Claims, 4 Drawing Sheets

U.S. PATENT DOCUMENTS

| | | | | |
|---|---|---|---|---|
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,159,098 | A * | 12/2000 | Slomiany et al. | 463/25 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 7,481,430 | B1 * | 1/2009 | Jackson et al. | 273/138.1 |
| 7,578,739 | B2 * | 8/2009 | Gauselmann | 463/27 |
| 8,096,868 | B2 * | 1/2012 | Trainor et al. | 463/20 |
| 2002/0138594 | A1 | 9/2002 | Rowe | 709/219 |
| 2002/0151354 | A1 * | 10/2002 | Boesen et al. | 463/25 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Englman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073887 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |

| | | | | |
|---|---|---|---|---|
| 2007/0060244 A1 | 3/2007 | Yaldoo et al. | | 463/16 |
| 2007/0060271 A1 | 3/2007 | Cregan et al. | | 463/16 |
| 2007/0060314 A1 | 3/2007 | Baerlocher et al. | | 463/25 |
| 2007/0060319 A1 | 3/2007 | Block et al. | | 463/27 |
| 2007/0060365 A1 | 3/2007 | Tien et al. | | 463/42 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

International Search Report—PCT/US06/20979 dated Nov. 13, 2006 (2 pages).

* cited by examiner

WAGERING GAME WITH RANDOMLY FUNDED PROGRESSIVE AMOUNTS

RELATED APPLICATIONS

This application claims priority from PCT Application No. PCT/US 2005/025842 filed Jul. 21, 2005 which in turn claims priority from U.S. Provisional Application No. 60/591,740 filed Jul. 28, 2004. Both of these applications are hereby incorporated by reference in their entirety.

FIELD OF THE INVENTION

The present invention relates generally to gaming terminals and, more particularly, to a gaming terminal having randomly funded progressive jackpots.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In many current wagering games, the progressive jackpots are funded in part by taking a percentage of the coin-in. After the progressive jackpot is won, the progressive jackpot will be set to some basic level (e.g., $1,000 or $5,000) and then every time a player inserts a coin to make a wager, a percentage is sent off to each of the progressive jackpots. This percentage is then divided in some predetermined way between all of the progressive jackpots. For example, if there are three progressive jackpots, a third of the percentage of the coin-in may be sent to each of the progressive jackpots. In other cases, one of the progressive jackpots may get one half of the percentage, another progressive jackpot may receive one third of the percentage, and the final progressive jackpot will get the remaining one sixth. This type of funding can become boring to the player because the player will see the amounts slowly creeping up, but never making any big leaps. Also, because it is predictable, many players will also find that boring.

Thus, there is a need to provide for a different type of funding method for progressive jackpots that provides more player excitement by rapidly increasing certain jackpots in an unpredictable manner

SUMMARY OF THE INVENTION

The present invention satisfies the needs mentioned above by randomly funding a plurality of progressive jackpots. This causes the jackpots to increase by larger amounts and in an unpredictable manner, which is exciting to a player.

In one embodiment of the present invention, a method for playing a wagering game is provided. The wagering game allows the player to be eligible for a plurality of progressive jackpots. The method includes conducting a wagering game that has a randomly selected outcome and awarding a player a payout amount if the randomly selected outcome is one of a plurality of winning outcomes. The method further includes randomly selecting one or more of the plurality of progressive jackpots that are to be increased.

In another embodiment of the present embodiment, there is provided a gaming system that includes a gaming terminal for playing a wagering game. The wagering game has a plurality of symbols that indicate a randomly selected outcome of the wagering game. The wagering game allows the player to be eligible for a plurality of progressive jackpots. A controller is coupled to the gaming terminal and is operative to randomly select one or more of the plurality of progressive jackpots to be increased. The amount of increase is typically a portion of wager input from the player. Further, the percentages of the portion that are allocated to each progressive jackpot can be randomly selected as well.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
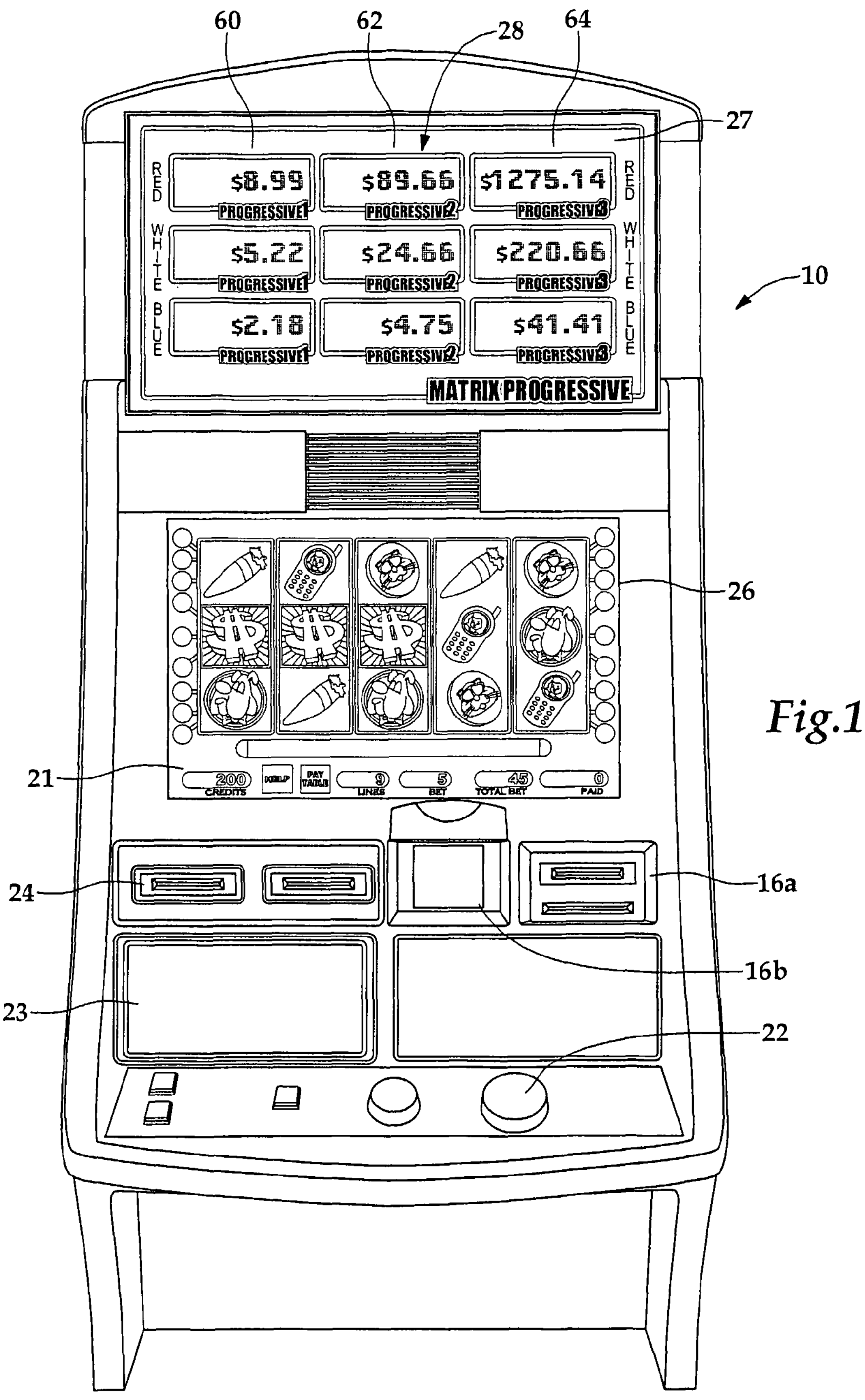
FIG. 1 is a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor **16*a* and a cash wager acceptor 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. In this embodiment, the secondary display 27 displays a progressive jackpot array 28 (or matrix). While these typical components found in the gaming terminal 10** are described below, it should be understood that numerous other elements may exist and may be used in any number of combinations to create various forms of a gaming terminal.

The wager acceptor 16 may be provided in many forms, individually or in combination. The cash wager acceptor **16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10**.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
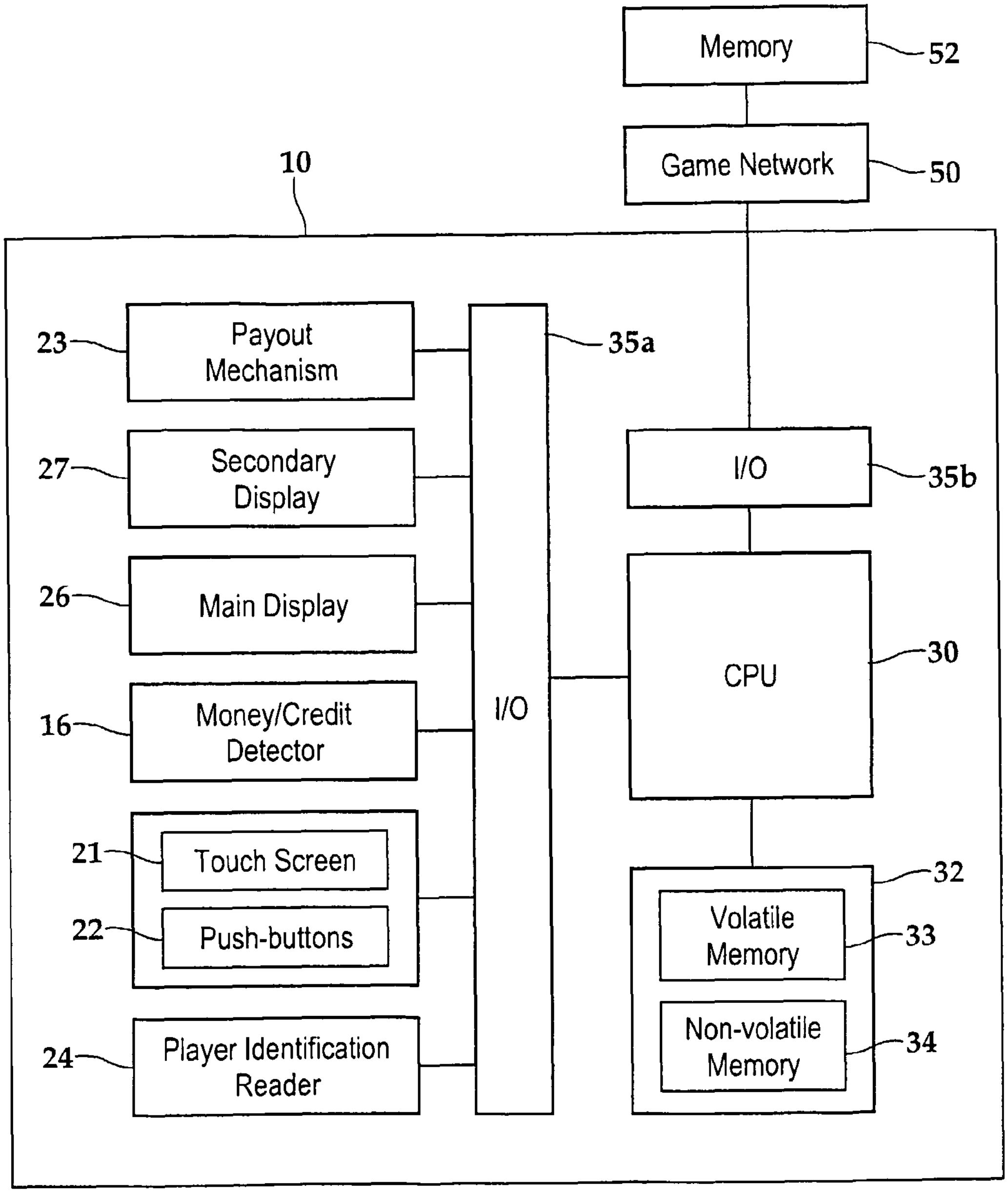
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits **35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35** may include a number of different types of I/O circuits.

In some embodiments, the CPU 30 may not be inside the gaming terminal 10. Instead, the CPU 30 may be part of a game network 50 and may be used to control numerous gaming terminals 10. The game network 50 typically has its own memory 52 for assisting with the various functions that it performs. One gaming network that is particularly useful with the present invention is the one described in "Restricted Access Progressive Game For A Gaming Machine," Ser. No. 60/502,762, filed Sep. 12, 2003, which is hereby incorporated by reference in its entirety. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks).

Figure 3:
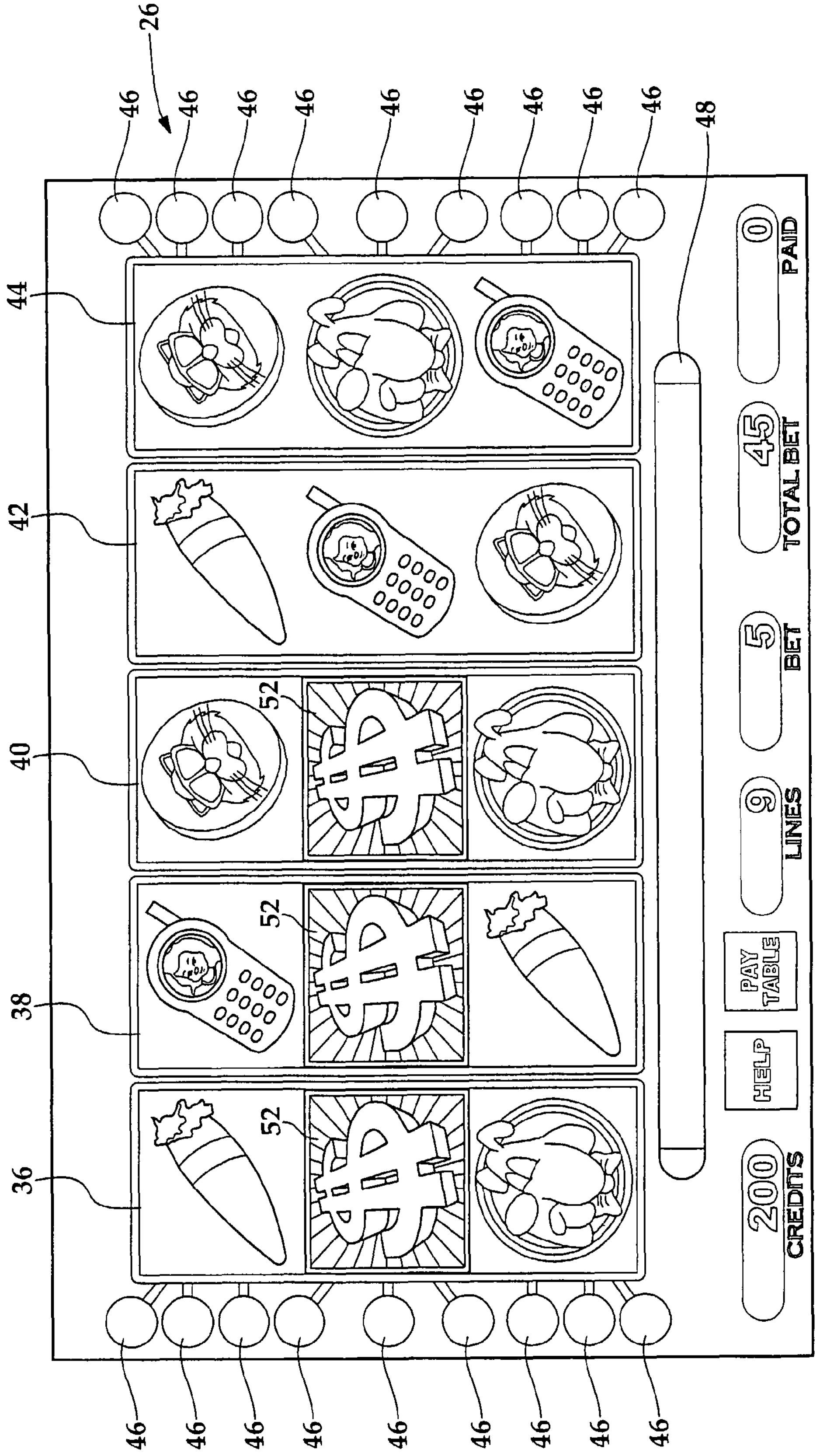
FIG. 3 illustrates a display of a basic game on the gaming terminal of FIG. 1.

Turning now to FIG. 3, the main display 26 of one embodiment of the present invention is shown in more detail. In this embodiment, the basic wagering game is a slot machine game, with symbols on five different reels 36, 38, 40, 42, 44. The reels 36-44 may be either traditional mechanical reels or they may be computer-generated images of reels, with each reel composed of a plurality of symbols. The payline indicators 46 indicate a randomly selected outcome for each payline, which is the combination of symbols on the reels 36-44. Thereafter, an outcome indicator 48 indicates whether the outcome has resulted in a winning outcome or a non-winning outcome. In the present example, various combinations of the symbols can result in winning outcomes, which include monetary and non-monetary prizes. The monetary prizes can include predetermined numbers of credits and/or progressive jackpot outcomes, which result in the player winning one of the progressive jackpots. The non-monetary prizes can include free spins, multipliers, and entry into an advanced game such as bonus game or a progressive game. While multiple paylines are shown, a gaming terminal 10 with a single payline will also work with the present invention.

During the play of the game in this embodiment, certain symbol combinations randomly contribute an amount (i.e. fund) to at least one of the nine jackpots shown in the progressive jackpot array 28. The amount contributed may be a set percentage of the amount wagered (e.g., 20% of the total wager amount), or it may be a set credit amount (e.g., $1 or 1 credit).

In the preferred embodiment, at least one of the nine progressive jackpots in the array 28 are increased whenever the player achieves a progressive jackpot triggering symbol, such as the dollar sign 52 on any of the reels. The symbol could cause the same amount (e.g., three credits) to go into each of the nine progressive jackpots, or it could trigger a larger total amount (e.g., 27 credits) to be credited to only one progressive jackpot. Because the crediting of the progressive jackpots is random, the progressive jackpots do not increase continuously at predetermined rates as previously known. Instead, the progressive jackpots can increase at higher rates randomly throughout the gaming session. This causes greater player excitement, because the increase is very visible and is unpredictable.

In one embodiment, the progressive jackpots are only increased when a non-winning outcome is achieved. By increasing the jackpot when the player has a non-winning or "losing" outcome, the player will feel as though there is a chance of earning the wager back.

In some embodiments, the amount that the particular progressive jackpot (or total of all the progressive jackpots) is increased may be the entire wager amount placed by the player, or the amount of increase may even exceed the amount of the wager placed by the player. For example, some combinations may cause a multiplier (e.g., 2 or 3) to be applied. This causes the progressive jackpot to increase even more rapidly, and provides the player with greater incentives to continue playing the wagering game.

In other embodiments, even the amount that the progressive is increased may be randomly determined after the progressive increasing symbol combination is achieved. For example, if the progressive increasing symbol combination is three dollar signs in a row (as shown in FIG. 3), the amount that one of the progressive jackpots is increased may be any amount between one to five credits.

In another embodiment, the progressive jackpots may be funded by a set percentage of the coin-in (as is presently known), however, which progressive jackpot receives the percentage, and how much of the percentage, is decided randomly by either the CPU 30 of the gaming terminal 10 or a processor in the game network 50 (FIG. 2). In such an embodiment, the nine progressive jackpots are set at their various starting levels as normal, and every time a player plays the wagering game, a set percentage of the coin-in is allocated to be added to the progressive jackpots. However, which one (or how many) of the jackpots will be increased and, if multiple jackpots are to be increased, how much each jackpot is increased is randomly decided by either the CPU 30 or processor in the game network 50.

In alternative embodiments, the randomness may be weighted so that certain of the progressive jackpots, on average, are funded more frequently than others. For example, the progressive jackpot array 28, as shown in FIG. 1, may be divided by columns into the progressive 1 column 60, the progressive 2 column 62, and the progressive 3 column 64, with each column generally offering slightly higher progressive jackpots than the column directly to the left. In order to keep this order, the progressive 3 column 64 may be funded more frequently than either the progressive 2 column 62 or the progressive 1 column 60. However, exactly which of the progressive jackpots that is funded is still random. Such a funding distribution that favors the larger progressive jackpots can be thought of as a weighted-random or pseudo-random funding, which can be used in place of the pure-random funding described above.

In all of these embodiments, the randomly selected outcome includes at least one winning outcome. The winning outcome can result in the player being awarded a set monetary or non-monetary result or can also result in the player winning one or more of the plurality of progressive jackpots displayed in the progressive jackpot matrix 28.

Figure 4:
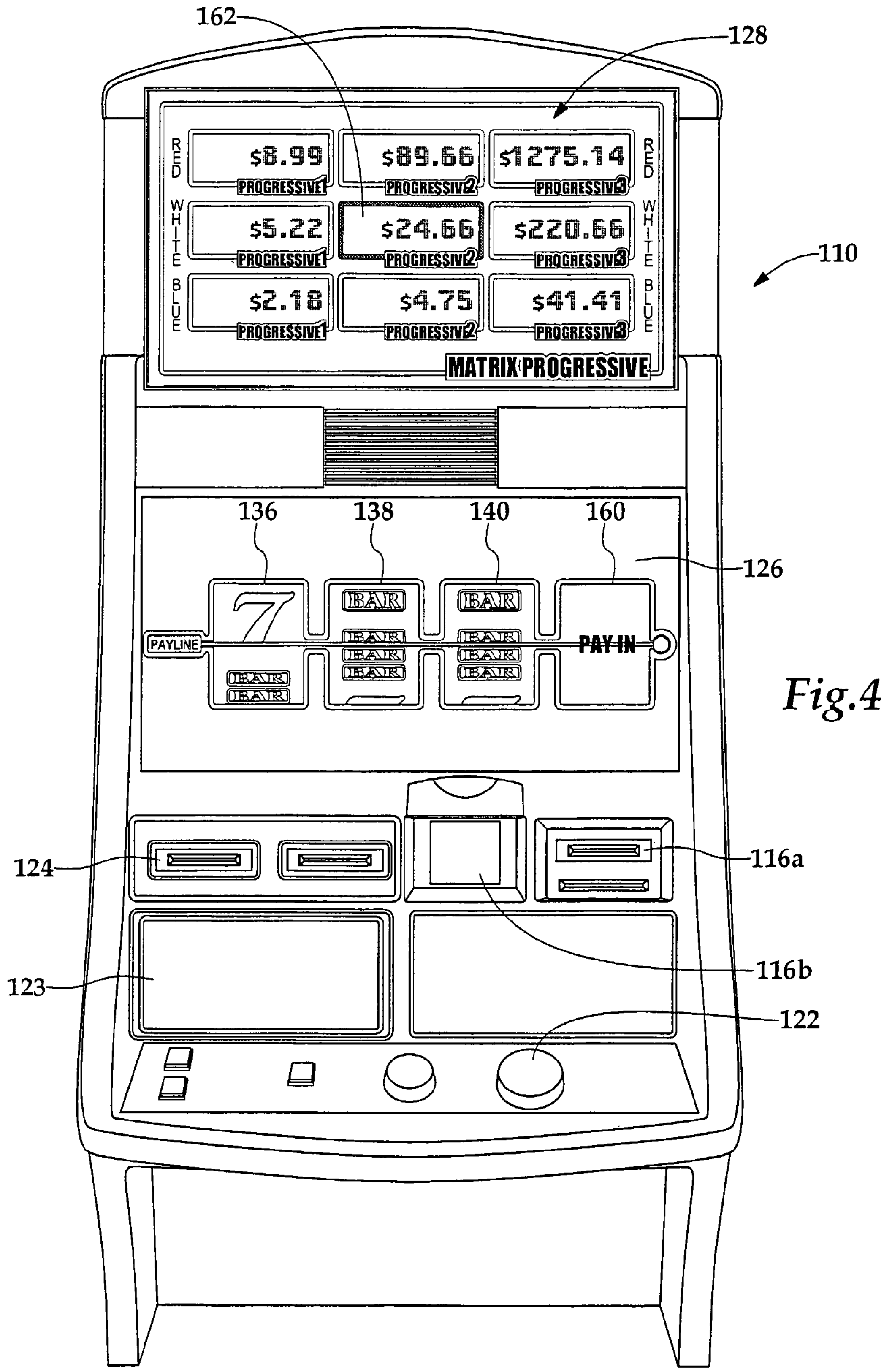
FIG. 4 is a perspective view of a gaming terminal according to another embodiment of the present invention.

Turning now to FIG. 4, another embodiment of the present invention will be described. In this embodiment, a gaming terminal 110 includes a main display 126 and a secondary display 127. The main display 126 includes three reels 136, 138, 140 that each have a plurality of symbols and operate the basic game as described above. In addition to the three mechanical reels, there is a fourth reel 160. The fourth reel 160 is a progressive jackpot reel and remains dark (e.g., black glass) while the three mechanical reels 136, 138, 140 spin during the basic game. The secondary display 127 provides a display of a progressive jackpot matrix 128, which is similar to the progressive jackpot matrix 28 shown in FIG. 1.

In this embodiment, when the three basic game reels 136, 138, 140 stop spinning, if the symbols on those reels result in a progressive jackpot indicator, the fourth reel 160 lights up to reveal whether the player is awarded the corresponding progressive jackpot or whether the gaming terminal 110 pays into (i.e., funds) the corresponding progressive jackpot. In the FIG. 4, the "three bars" symbol corresponds to the progressive jackpot 162 in the white row, Progressive 2 column (as highlighted on FIG. 4). The fourth reel 160 is then spun (or may have already been spun) and reveals that the result is a "pay-in." Thus, in the illustrated embodiment, the highlighted progressive jackpot 162 receives additional funding by a certain amount related to the player's wager input in the basic game yielding the symbols on the reels 136, 138, 140. The amount may be a set percentage of the wager input or may be a random amount.

Alternatively, the fourth reel 160 could have resulted in a "pay-out" outcome in which the middle progressive jackpot 162 is awarded to the player. This embodiment adds greater excitement because of the element of surprise as to whether the player will win the progressive jackpot or whether the player will simply contribute to the progressive jackpot. Because some of the progressive-jackpot winning combinations in the basic game reels 136, 138, 140 will result in a zero payout, but instead a contribution, the probability of achieving progressive-jackpot winning combinations can be increased, yielding further excitement to the player.

In another embodiment, the fourth reel 160 may not remain dark. The progressive jackpots in the matrix 128 may be highlighted as corresponding symbols on the basic game reels 136, 138, 140 spin across the payline. This would allow the player to see what types of winnings there are and how close the player has come to winning one of them (or how close he or she has come to paying into, i.e., funding, one or more of the jackpots).

In another embodiment, the symbols on the game reels 136, 138, 140 may not correspond directly to a particular progressive jackpot in the matrix 128. Instead, the progressive jackpot that is awarded (or credited) may be randomly decided by the gaming terminal 110 or by an external game network, such as the game network 50 of FIG. 2, and the fourth reel 160 indicates which jackpot is awarded or receives funding. As such, FIG. 4 describes another manner in which one or more of a plurality of jackpots is randomly funded by a portion or all of a player's wager input (or an amount greater than the player's wager inputs).

Although the present invention has been described by showing the plurality of progressive jackpots in the form of a matrix, the invention can be used with any type of progressive game system having multiple jackpots. For example, there are different systems for determining a progressive jackpot winning event at a gaming terminal. The first type gaming-terminal enabled, which occurs when a "progressive winning position" is achieved at a participating gaming terminal. A progressive winning position is a module within a gaming terminal's software code that responds with a progressive jackpot won event when certain game-level conditions are met, such as a winning reel position on a slot machine. Only one progressive game may be assigned to a progressive winning position at a time. This position has a single winning percentage. At the time the progressive winning position occurs at a gaming terminal, the winning gaming terminal is disabled from play and immediately transmits the jackpot won event to the central system, such as network 50 (FIG. 2). The central system calculates a final prize amount and transmits this amount to the winning gaming terminal and to the other gaming terminals competing for the same progressive. The second type of jackpot won event is central system-enabled. A progressive winning position is not used to generate a jackpot won event when a progressive game awards a jackpot using a central system-enabled jackpot won event. An example may be a message sent from the central system to the next gaming terminal that places a wager. A central system-enabled jackpot won event may, for example, be used in a mystery progressive system.

Further, it should be noted that while the present invention has been described with respect to a basic game that triggers the crediting (i.e., funding) of a certain progressive jackpot, the bonus or secondary game could be equally employed to perform this task.

While the present invention has been described with reference to one or more particular embodiments, those skilled in the art will recognize that many changes may be made thereto without departing from the spirit and scope of the present invention. For example, in embodiments illustrated in FIGS. 1-3, the display 26 was a video display. It should be understood that the display 26 could also be mechanical reels. Furthermore, FIG. 4 is shown using mechanical reels, but it should be understood that a video display could also be used. Also, progressive jackpots are often displayed on signage that is located proximate to (usually above) the gaming terminals, which can also be done in accordance to the present invention. Each of these embodiments and obvious variations thereof is contemplated as falling within the spirit and scope of the claimed invention, which is set forth in the following claims.

What is claimed is:

1. A gaming system operable to conduct a wagering game including one or more symbol combinations randomly selected from a plurality of symbols, at least one symbol combination of the symbols of the plurality being a progressive jackpot indicator combination, the system comprising:
- at least one input device;
- one or more display devices;
- one or more processors;
- at least one memory device storing instructions that, when executed by the one or more processors, cause the one or more processors to operate with the at least one input device and the one or more display devices to:
  - receive a wager from a player to initiate the wagering game;
  - display the one or more symbol combinations to indicate a wagering game outcome;
  - in response to the displayed one or more symbol combinations indicating a payout outcome including the progressive jackpot indicator combination, award the player one of a plurality of progressive jackpots;
  - in response to the displayed one or more symbol combinations indicating a pay-in outcome including at least one but not all of the symbols of the progressive jackpot indicator combination, wherein all pay-in outcomes are non-winning progressive outcomes, increase an award value of one or more of the plurality of progressive jackpots.

2. The gaming system of claim 1, wherein the pay-out outcome includes three designated symbols plus a "Pay Out" symbol.

3. The gaming system of claim 1, wherein the pay-in outcome includes three or less designated symbols plus a "Pay In" symbol.

4. The gaming system of claim 1, wherein the pay-out outcome includes a plurality of progressive jackpot triggering symbols, and wherein the pay-in outcome includes at least one but less than all of the plurality of progressing jackpot triggering symbols.

5. The gaming system of claim 1, wherein the pay-out outcome includes the designated symbols occurring anywhere in the displayed array.

6. The gaming system of claim 1, wherein the pay-out outcome includes the designated symbols occurring on an active payline.

7. The gaming system of claim 1, wherein the pay-in outcome increases the award values of all of the plurality of progressive jackpots.

8. The gaming system of claim 1, wherein the pay-in outcome increases the award values of only one progressive jackpot.

9. A computer-implemented method of randomly funding a plurality of progressive jackpots, the method comprising:
- receiving, via at least one input device, a wager from a player initiating a wagering game;
- randomly selecting, via one or more processors, one or more symbol combinations from a plurality of symbol combinations, wherein the plurality of symbol combinations includes at least one progressive jackpot indicator combination;
- displaying the one or more symbol combinations to indicate a wagering game outcome;

in response to the displayed one or more symbol combinations indicating a pay-out outcome including the progressive jackpot indicator combination, awarding the player one of the plurality of progressive jackpots; and in response to the displayed one or more symbol combinations indicating a pay-in outcome including at least one but not all of the symbols of the progressive jackpot indicator combination, wherein all pay-in outcomes are non-winning progressive outcomes, increasing an award value of one or more of the plurality of progressive jackpots.

10. The method of claim 9, wherein the pay-in outcome increases the award values of the one or more of the plurality of progressive jackpots by either a set percentage of a wager amount or a set credit amount.

11. The method of claim 9, wherein the pay-in outcome increases the award values of the one or more of the plurality of progressive jackpots by a randomly selected amount.

12. The method of claim 9, wherein the pay-out outcome includes a designated symbol on an extra reel.

13. The method of claim 9, wherein the pay-in outcome includes a designated symbol on an extra reel.

14. The method of claim 9, wherein the pay-in outcome includes a multiplier that applies to an increase amount.

15. The method of claim 9, the pay-in outcome includes a symbol that designates a certain progressive jackpot to be increased.

16. The method of claim 9, wherein the pay-in outcome is weighted such that a probability of increasing the award value of a certain progressive jackpot of the plurality of progressive jackpots is greater that a probability of increasing the award value of another progressive jackpot of the plurality of progressive jackpots.

17. A computer-readable, non-transitory medium including computer-readable instructions that, when executed by a gaming system, cause the gaming system to perform the method comprising:

receiving, via at least one input device, a wager from a player initiating a wagering game;

randomly selecting, via one or more processors, an array of symbol combinations from a plurality of symbol combinations, wherein the plurality of symbol combinations includes at least one progressive jackpot indicator combination;

displaying the array of symbol combinations to indicate a wagering game outcome;

in response to the displayed array indicating a pay-out outcome including the progressive jackpot indicator combination, awarding the player one of the plurality of progressive jackpots; and in response to the displayed array indicating a pay-in outcome including at least one but not all of the symbols of the progressive jackpot indicator combination, wherein all pay-in outcomes are non-winning progressive outcomes, increasing an award value of one or more of the plurality of progressive jackpots.

18. The medium of claim 17, wherein gaming system is connected for communication over a communications network, and wherein the medium resides on a game server on the communications network.

19. The medium of claim 17, wherein the pay-out outcome awards the player every progressive jackpot of the plurality of progressive jackpots.

* * * * *